United States Patent
Masada et al.

(10) Patent No.: US 6,267,131 B1
(45) Date of Patent: Jul. 31, 2001

(54) METHOD OF CONTROLLING PRESSURE IN A CHAMBER, APPARATUS FOR THE SAME, AND EXPOSURE APPARATUS

(75) Inventors: Mutsuo Masada, Funabashi; Masao Nakata, Tokyo; Masahiro Shiraishi, Kashiwa; Makoto Ogawa, Hiratsuka; Katsuhiro Kato, Urawa; Yukiharu Okubo, Kawasaki, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/594,345

(22) Filed: Jun. 15, 2000

Related U.S. Application Data

(63) Continuation of application No. PCT/JP98/05706, filed on Dec. 17, 1998.

(30) Foreign Application Priority Data

Dec. 18, 1997 (JP) .................................................. 9-349646

(51) Int. Cl.$^7$ ............................. G05D 16/20; F24F 11/00
(52) U.S. Cl. .......................... 137/12; 137/14; 137/81.1; 137/487.5; 137/454; 137/255
(58) Field of Search ..................... 137/12, 14, 81.1, 137/485, 488, 487.5; 454/70, 238, 255

(56) References Cited

U.S. PATENT DOCUMENTS

| | | | |
|---|---|---|---|
| 3,974,752 | * 8/1976 | Burgess et al. | 137/81.1 |
| 4,798,521 | * 1/1989 | Schmidt et al. | 137/487.5 |
| 5,357,996 | * 10/1994 | Ioannides | 137/487.5 |
| 5,385,505 | * 1/1995 | Sharp et al. | 454/238 |

FOREIGN PATENT DOCUMENTS

| | | |
|---|---|---|
| A-6-275494 | 9/1994 | (JP) . |
| A-6-302498 | 10/1994 | (JP) . |
| A-7-192990 | 7/1995 | (JP) . |
| A-7-283114 | 10/1995 | (JP) . |
| A-9-115800 | 5/1997 | (JP) . |

\* cited by examiner

*Primary Examiner*—Michael Powell Buiz
*Assistant Examiner*—Ramesh Krishnamurthy
(74) *Attorney, Agent, or Firm*—Oliff & Berridge, PLC

(57) ABSTRACT

A method of controlling pressure in a chamber, wherein the pressure in a chamber in which measurement such as laser measurement is conducted is maintained at a set pressure with respect to fluctuations in external atmospheric pressure, characterized by comprising: detecting the external atmospheric pressure, obtaining a long-term flat pressure value with respect to short time fluctuations of the detected external atmospheric pressure, creating a set pressure in the chamber by adding a predetermined pressure to the obtained pressure value, and detecting the pressure in the chamber while introducing external air so that the pressure in the chamber reaches the set pressure.

23 Claims, 2 Drawing Sheets

METHOD OF CONTROLLING PRESSURE IN A CHAMBER, APPARATUS FOR THE SAME, AND EXPOSURE APPARATUS

This is a Continuation of; International Appln. No. PCT/JP98/05706 filed Dec. 17, 1998 which designated the U.S.

TECHNICAL FIELD

The present invention relates to method of controlling pressure in a chamber accommodating a stepper exposure apparatus, a laser measurement apparatus or the like, and to an apparatus for the same, and an exposure apparatus.

BACKGROUND ART

Exposure apparatus, laser measurement apparatus or the like are accommodated in a chamber formed for example in a clean room, and the position of an X-Y stage thereof is accurately measured with a laser interferometer.

With this measurement using a laser interferometer, since the laser wavelength changes due to changes in temperature or humidity, the temperature and humidity inside the chamber is controlled by an air conditioner.

However, if air disturbances occur along the interferometer beam optical path, the refractive index of the air in the optical path changes, or the laser wavelength changes so that consequently there is a drop in measurement accuracy.

For example, in the case where the temperature, pressure and humidity along the optical path respectively change as $\Delta T$ (° C.), $\Delta P$ (hPa), $\Delta H$ (%), then the relative change amount $\Delta \lambda / \lambda$ of the laser wavelength $\lambda$ can be approximately expressed by the following equation:

$$\Delta \lambda / \lambda = (0.93 \Delta T + 0.27 \Delta P - 0.0098 \Delta H) \times 10^{-6}$$

At this time, the measurement error for a measurement length L is according to the following equation:

$$\Delta L = L \times (\Delta \lambda / \lambda)$$

For example for a measurement length L=50 mm, in order to permit a measurement error $\Delta L < 1$ nm ($10^{-9}$ m), the following must apply:

$\Delta T < 0.022°$ C.

$\Delta P < 0.074$ hPa $\Delta H < 2.01\%$ (here only one parameter has been calculated, with other parameters fixed for convenience) With present state chambers the following specifications are met:

Temperature accuracy ripple value=0.02° C. or less

Humidity accuracy ripple value=0.4° C. or less Hence for the temperature and humidity, these are within tolerance.

However, control of pressure inside the chamber is not at present performed.

Atmospheric pressure is the weight of air per unit area. In the normal range of 800~1100 hPa, this continuously changes with the meteorological situation. Normally, with the chamber, the sealing is high, however if there is a gap of pin hole order, the chamber interior and the outside air side are effectively connected pressure wise. Therefore the inside-chamber pressure immediately fluctuates with fluctuations in the external atmospheric pressure. In particular, it is known that for example on windy days, fast fluctuations with periods of several seconds are seen (short period fluctuations), so that the maximum amplitude inside the chamber is as much as 0.4 hPa.

Normally, with long period fluctuations in external atmospheric pressure, these can be corrected by the measuring system software. However, with short period fluctuations in external atmospheric pressure, there is a problem that these cannot be fully corrected.

Furthermore, it has also been considered to control the inside-chamber pressure to an absolute pressure (constant pressure value) irrespective of fluctuations in external atmospheric pressure. In this case however, if the set absolute inside-chamber pressure is 1000 hPa (1 atm.), then for the chamber, a pressure resistant container where the volume does not change even for fluctuations of ±100 hPa (1020 kg/m$^2$) is required. At present such a chamber does not exist. That is to say, the plate thickness of the chamber wall must be a plate thickness such as for a submarine.

It is therefore an object of the present invention to address the above problems by providing a method and apparatus for controlling the pressure in a chamber which, when the pressure inside a chamber in which laser measurement is being conducted follows long period fluctuations in external atmospheric pressure, can suppress any following of short period fluctuations in external atmospheric pressure contained in the long period fluctuations in external atmospheric pressure.

DISCLOSURE OF THE INVENTION

To meet the above objectives, a first aspect of the present invention is a method of controlling pressure in a chamber, wherein the pressure in a chamber in which measurement such as laser measurement is conducted is maintained at a set pressure with respect to fluctuations in external atmospheric pressure, comprising the steps of: detecting the external atmospheric pressure; obtaining a long-term flat pressure value with respect to short time fluctuations of the detected external atmospheric pressure; creating a set inside-chamber pressure by adding a predetermined pressure to the obtained pressure value; and detecting the inside-chamber pressure while introducing external atmospheric so that the inside-chamber pressure reaches the set pressure.

A second aspect of the present invention, is a method of controlling pressure in a chamber, wherein the air in a chamber in which measurement such as laser measurement is conducted is circulated with an external air adjuster to maintain the inside-chamber pressure at a set pressure with respect to fluctuations in external atmospheric pressure, involving: detecting the external atmospheric pressure, obtaining a long-term flat pressure value with respect to short time fluctuations of the detected external atmospheric pressure, creating a set inside-chamber pressure by adding a predetermined pressure to the obtained pressure value, and detecting inside-chamber pressure while introducing external air to the external air adjuster so that the inside-chamber pressure reaches the set pressure.

A third aspect of the present invention, is a method of controlling pressure in a chamber according to the second aspect, wherein the external air adjuster comprises; a fan, a damper for adjusting air circulation amount, and an external air introducing valve connected to the fan inlet side, and an opening of the external air introducing valve is adjusted based on a difference between the created set inside-chamber pressure and the detected inside-chamber pressure, to control an external air introduction amount.

A fourth aspect of the present invention, is a method of controlling pressure in a chamber according to any one of the first through third aspects, wherein the control of the external air introduction amount is controlled at a sufficiently high speed with respect to a period of the short time fluctuations of the external atmospheric pressure.

A fifth aspect of the present invention, is an apparatus for controlling pressure in a chamber, wherein the air in a chamber in which measurement such as laser measurement is conducted is circulated with an external air adjuster, and external air is introduced by the external air adjuster to maintain the inside-chamber pressure higher than the external atmospheric pressure, and the apparatus comprises: an external atmospheric pressure sensor that detects external atmospheric pressure; an internal pressure sensor for detecting inside-chamber pressure; and an inside-chamber pressure control device which obtains a long-term flat pressure value with respect to short time fluctuations of the external atmospheric pressure detected by the external atmospheric pressure sensor, creates a set inside-chamber pressure by adding a predetermined pressure to the obtained pressure value, and controls the external air introduction amount with the external air adjuster according to a difference between the inside-chamber pressure detected by the internal pressure sensor and the set inside-chamber pressure.

A sixth aspect of the present invention, is an apparatus for controlling pressure in a chamber according to the fifth aspect, where an air circulation system, that supplies air discharged from inside the chamber back to the chamber, is connected to a chamber in which measurement such as laser measurement is conducted, and the external air adjuster comprises; a fan; a damper for adjusting air circulation amount; and a flow rate control valve connected to the fan inlet side for introducing external air, and the inside-chamber pressure control device adjusts the opening of the external air introducing valve based on a difference between the created set inside-chamber pressure and the detected inside-chamber pressure.

EMBODIMENTS

Hereunder is a detailed explanation of a preferred embodiment of the present invention based on the appended drawings.

Figure 1:
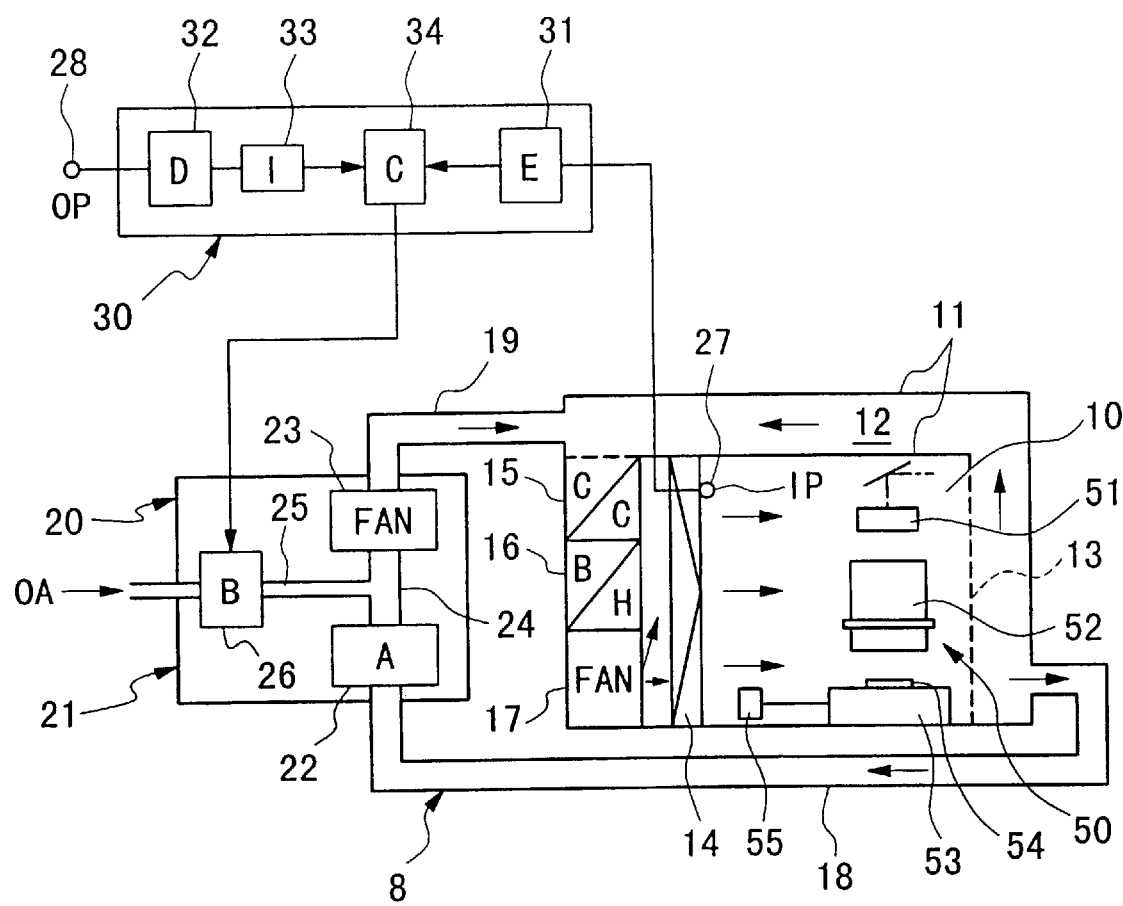
FIG. 1 is a diagram showing an embodiment of the present invention.

In FIG. 1, reference symbol 10 denotes a chamber compartmentalized by bulkheads 11 and accommodating a stepper exposure apparatus 50. Connected to the chamber 10 is a return duct 12 constituting an air circulation system 8 for circulating air inside the chamber 10.

Hereunder is a description of the exposure apparatus 50 accommodated inside the chamber 10.

The exposure apparatus 50 is an apparatus for illuminating a reticle 51 on which is formed an IC circuit pattern or the like, with light from a light source provided inside different case (not shown in the figure) to the chamber 10, by way of an illumination optical system, to thereby transfer an image of the pattern onto a wafer 54 mounted on a stage 53, via a projection optical system 52. Furthermore, inside the chamber 10 is arranged a laser interferometer 55 for measuring the position of the stage 53.

On one side face of the chamber 10 is a filter 14, while on the other side face is a vent plate 13. A refrigeration cooler 15, a reheat heater 16, and a circulation fan 17 are accommodated behind the filter 14. By means of the circulation fan 17, air from the return duct 12 which has been humidity controlled by way of the refrigeration cooler 15 and the reheat heater 16, is subsequently blown into the chamber 10 via the filter 14.

The air circulation system 8 is constructed with an external air adjuster 20 connected to the return duct 12 via a suction duct 18 and a blowing duct 19, and the circulation air thereof is used to carry out humidity control inside the chamber 10.

The external air adjuster 20 is provided with a damper 22 for adjusting the circulation air amount inside the case 21 and a fan 23. The damper 22 is connected to the suction duct 18, while the outlet side of the fan 23 is connected to the blowing duct 19. An external air introducing duct 25 is connected to a suction path 24 between the damper 22 and the fan 23. An external air introducing valve 26 for controlling the intake amount of introduced external air OA, is connected to the duct 25.

An internal pressure introducing section 27 is provided in the chamber 10. Moreover, an external atmospheric pressure introducing section 28 is provided outside of the bulkheads 11. Internal pressure IP and external atmospheric pressure OP from these introducing sections 27 and 28 are respectively detected by an internal pressure sensor 31 and an external atmospheric pressure sensor 32 of a chamber pressure control device 30.

The internal pressure introducing section 27 comprises a pipe. So as not to receive an influence from the dynamic pressure due to the air flow discharged from the filter 14, this is provided facing the same direction as the discharge direction of air flow.

The chamber pressure control device 30 controls the opening of the external air introducing valve 26, based on detection values from the internal pressure sensor 31 and the external atmospheric pressure sensor 32, to thereby control the pressure inside the chamber 10 to maintain a set pressure a predetermined pressure above the external atmospheric pressure.

Next is a detailed description of the control method.

At first, the external atmospheric pressure OP detected by the external atmospheric pressure sensor 32 is signal converted by a signal converter 33, to obtain a long-term flat pressure value with respect to short time fluctuations of the external atmospheric pressure. A set inside-chamber pressure (TP) is then prepared by adding a predetermined pressure (for example 1~2 hPa=10~mmAq) to the obtained pressure value. This is then input to a controller 34.

Here is a description concerning obtaining the long-term flat pressure value with respect to short time fluctuations of the external atmospheric pressure.

The external atmospheric pressure sensor 32 detects the external atmospheric pressure OP in which fluctuations with a long period (long-term fluctuations) and fluctuations with a short period (short-term fluctuations) coexist. The external atmospheric pressure OP detected by the external atmospheric pressure sensor 32 is output to the signal converter 33. The signal converter 33 suppresses the short-term fluctuation portion in the external atmospheric pressure OP and removes this fluctuation portion from the external atmospheric pressure OP, or suppresses the magnitude of the amplitude of the short-term fluctuation portion with respect to the long-term fluctuation portion. Therefore, the signal converter 33 is made up of an arithmetic unit for taking a moving average of the external atmospheric pressure OP, and comprises a low pass filter for removing the short-term fluctuation portion from the external atmospheric pressure OP, and outputting only the long-term fluctuation portion. Then, the signal converter 33 creates a set inside-chamber pressure TP by adding the predetermined pressure to the external atmospheric pressure OP for which the short-term fluctuation portion has been suppressed or removed.

On the other hand, the inside-chamber pressure IP of the chamber 10 is detected by the internal pressure sensor 31, and the measurement value is input to the controller 34. The controller 34 controls the opening of the external air introducing valve 26 based on a difference between the set inside-chamber pressure and the inside-chamber pressure measurement value.

While the fluctuation in external atmospheric pressure OP has a period of several tens of seconds, the opening control of the external air introducing valve 26 is controlled at a speed sufficiently faster than this fluctuation period.

Figure 2:
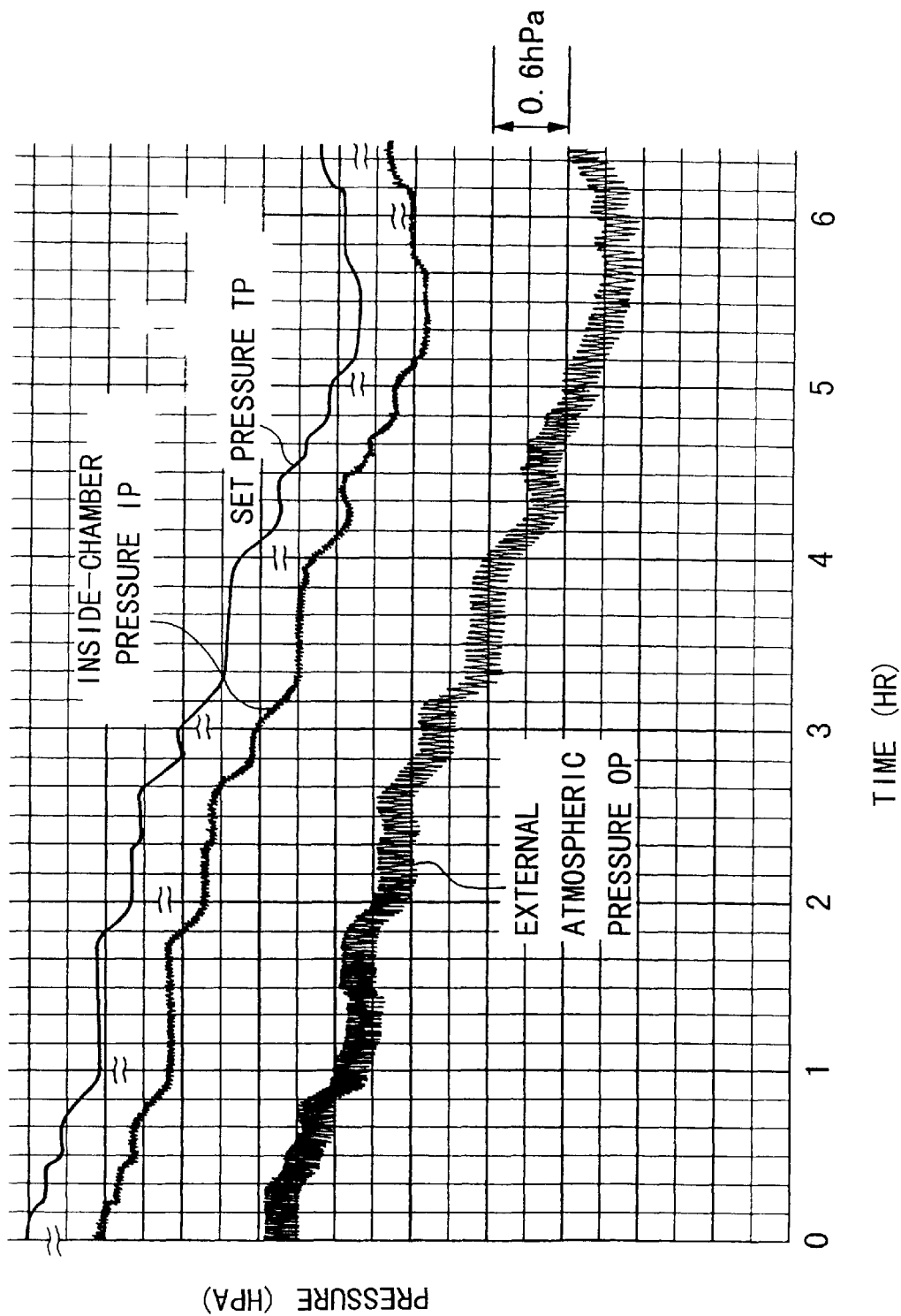
FIG. 2 is a diagram showing change in pressure of external air and pressure in a chamber with elapsed time when carrying out pressure control.

FIG. 2 shows change in pressure with elapsed time for when an experiment was conducted for controlling the pressure in the chamber 10.

In this experiment, the circulation flow rate of the external air adjuster 20 was 3m$^3$/min, and with a chamber maximum internal pressure for when the external air introducing valve 26 was fully open of +27 mmAq, and a chamber minimum internal pressure when fully closed of 11 mmAq, the control range was 10~20 mmAq (=1~2 hPa). The set inside-chamber pressure was set 1.6 hPa higher than the long-term flat atmospheric pressure (the pressure value for the long-term fluctuations with the short-term fluctuations removed) for the control range for when the external air introducing valve 26 was fully closed and fully open.

As shown in FIG. 2, with the external atmospheric pressure OP, the amplitude changes from approximately 0.2~0.3 hPa, and the period fluctuates at 30 seconds. A pressure value for where the short-term fluctuation portion of the external atmospheric pressure OP had been removed by the signal converter 33 was obtained, and 1~2 hPa was added to this to create a set inside-chamber pressure TP. By controlling the pressure in the chamber 10 which fluctuated corresponding to the fluctuations in the external atmospheric pressure OP, with the external air introduction amount, then with the inside-chamber pressure IP, the ripple value became less than approximately 0.06hPa, enabling less than the 0.074 hPa target level.

Here the set inside-chamber pressure TP and the inside-chamber pressure IP are approximately the same value. However, in the figure these are shown separate for convenience of description.

In this way, the long period external atmospheric pressure with the short time fluctuation portion removed from the external atmospheric pressure fluctuating at a short time is obtained, and taking into consideration the pressure control width of the external air introducing valve 26, the pressure in the chamber 10 is set high. By controlling the opening of the external air introducing valve 26 based on the set pressure and the inside-chamber pressure, the pressure change inside the chamber 10 becomes a long-term flat change, enabling a suitable environment for laser length measuring.

Furthermore, when controlling the pressure of the chamber 10, the air circulation system 8 is connected to the chamber 10. Then by maintaining a positive pressure inside the chamber 10 above the external atmospheric pressure, and introducing external air to the closed loop air circulation system 8 to control the pressure in the chamber 10, pressure fluctuations of the chamber 10 can be suppressed with the introduction of only a slight amount of external air.

Moreover with a measure of 10 (1/min) approximately for the amount of introduced external air, the influence on the humidity inside the chamber 10 is very small.

With the above embodiment, the external air is supplied to the suction side of the fan 23 of the external air adjuster 20. However the external air may be supplied directly to inside the bulkheads 11, or to the return duct 12 or to the chamber 10, without using the external air adjuster 20.

With the present environment, the external atmospheric pressure and the internal pressure are detected via the internal air introducing portion and the external air introducing portion. However of course an external atmospheric pressure sensor may be directly provided outside the chamber, and an internal pressure sensor directly provided inside the chamber.

For the filter 14 used with the present embodiment, a filter such as; an organic filter for removing the silicon system organic matter (for example siloxane and silazane) used for degassing the adhesives and the like existing inside the chamber, or an activated carbon filter (for example GIGA-SOAP made by NITTA (Limited)) or a zeolite filter for removing plasticizers (phthalic acid ester and the like), flame retardants (phosphoric acid, and chloride system materials) used for degassing for wiring and plastics etc. inside the chamber, may be used.

Moreover, for the exposure apparatus accommodated inside the chamber, this may be a scanning type exposure apparatus which moves the mask and substrate synchronously to expose the pattern of the mask, or a step-and-repeat type exposure apparatus which exposes the pattern of the mask with the mask and substrate in a stationary condition, and then sequentially steps the substrate.

Furthermore, for the apparatus accommodated inside the chamber, this may be only a stage section for which position control is performed by a laser interferometer. Moreover, instead of an exposure apparatus, this may be another optical apparatus such as a wafer inspection apparatus or a pattern measuring apparatus. For the drive source for the stage, either of an air floatation type which uses a linear motor and air bearings, and a magnetic levitation type which uses Lorentz's force or reactance force may be used. Furthermore, for the stage, this may be a type which moves along a guide, or a guideless type where a guide is not provided.

With the chamber of the present embodiment, this may be manufactured by assembling the many mechanical components such as the bulkheads, the filter, the cooler, and the various ducts, and then connecting wiring and piping and carrying out overall adjustment (electrical adjustment, operation verification etc.). Furthermore, with the exposure apparatus of the present embodiment, this may be manufactured by assembling the illumination optical system comprising a plurality of lenses, and the projection optical system into the exposure apparatus main body and performing optical adjustment, and then fitting a wafer stage comprising several mechanical components to the exposure apparatus main body, connecting wiring and piping, and then performing an overall adjustment (electrical adjustment, operation verification etc.).

INDUSTRIAL APPLICABILITY

The present invention described above, enables an arrangement where the pressure in the chamber does not fluctuate with similar fluctuations following short time fluctuations in external atmospheric pressure.

What is claimed is:

1. A method of controlling pressure in a chamber, wherein the pressure in a chamber in which measurement such as laser measurement is conducted is maintained at a set pressure with respect to fluctuations in external atmospheric pressure, comprising the steps of:

detecting the external atmospheric pressure; obtaining a long-term flat pressure value with respect to short time fluctuations of the detected external atmospheric pressure; creating a set pressure in the chamber by adding a predetermined pressure to the obtained pressure value; and detecting the pressure in the chamber while introducing external air so that the pressure in the chamber reaches the set pressure.

2. A method of controlling pressure in a chamber, wherein the air in a chamber in which measurement such as laser measurement is conducted is circulated with an external air adjuster to maintain the pressure in the chamber at a set pressure with respect to fluctuations in external atmospheric pressure, comprising the steps of:

detecting the external atmospheric pressure; obtaining a long-term flat pressure value with respect to short time fluctuations of the detected external atmospheric pressure; creating a set pressure in the chamber by adding a predetermined pressure to the obtained pressure value; and detecting the pressure in the chamber while introducing external air to said external air adjuster so that the pressure in the chamber reaches the set pressure.

3. A method of controlling pressure in a chamber according to claim 2, wherein the external air adjuster comprises; a fan; a damper that adjusts air circulation amount; and an external air introducing valve connected to the fan inlet side, and an opening of the external air introducing valve is adjusted based on a difference between the created set pressure in the chamber and the detected pressure in the chamber, to control an external air introduction amount.

4. A method of controlling pressure in a chamber according to claim 1, wherein the control of the external air introduction amount is controlled at a sufficiently high speed with respect to a period of the short time fluctuations of the external atmospheric pressure.

5. An apparatus for controlling pressure in a chamber, wherein the air in a chamber in which measurement such as laser measurement is conducted is circulated with an external air adjuster, and external air is introduced by the external air adjuster to maintain the pressure in the chamber higher than the external atmospheric pressure, said apparatus comprising:

an external atmospheric pressure sensor disposed outside the chamber to detect external atmospheric pressure, an internal pressure sensor disposed inside of the chamber to detect pressure in the chamber, and a pressure-in-the-chamber controller connected to the external atmospheric sensor and the internal pressure sensor to obtain a long-term flat pressure value with respect to short time fluctuations of the external atmospheric pressure detected by the external atmospheric pressure sensor, creates a set pressure in the chamber by adding a predetermined pressure to the obtained pressure value, and controls the external air introduction amount with the external air adjuster according to a difference between the pressure in the chamber detected by said internal pressure sensor and the set pressure in the chamber.

6. An apparatus for controlling pressure in a chamber according to claim 5, where an air circulation system, that supplies air discharged from inside the chamber back to the chamber, is connected to a chamber in which measurement such as laser measurement is conducted, the external air adjuster comprises; a fan; a damper that adjusts air circulation amount; and a flow rate control valve connected to the fan inlet side for introducing external air, and the pressure-in-the-chamber controller adjusts the opening of said external air introducing valve based on a difference between the created set pressure in the chamber and the detected pressure in the chamber.

7. A pressure control apparatus for controlling pressure in a chamber comprising:

an external atmospheric pressure sensor disposed outside the chamber to detect external atmospheric pressure;

a signal converter connected to the external atmospheric pressure sensor to separate a long period fluctuation portion of atmospheric pressure and a short period fluctuation portion of atmospheric pressure from said atmospheric pressure detected by said external atmospheric pressure sensor; and a controller connected to the chamber to control the pressure in said chamber based on a pressure value for said long period fluctuation of atmospheric pressure.

8. A pressure control apparatus according to claim 7, wherein said signal converter is a low pass filter.

9. A pressure control apparatus according to claim 7, wherein said controller controls a flow rate of gas supplied to inside said chamber.

10. A pressure control apparatus according to claim 7, wherein said signal converter adds a predetermined pressure value to a pressure value for said long period fluctuations of external atmospheric pressure.

11. A pressure control method for controlling pressure in a chamber comprising the steps:

detecting atmospheric pressure chamber external to said chamber;

separating a long period fluctuation portion of atmospheric pressure and a short period fluctuation portion of atmospheric pressure from said detected atmospheric pressure; and controlling the pressure in said chamber based on a pressure value for said long period fluctuation of atmospheric pressure.

12. A pressure control apparatus for controlling pressure in a chamber comprising:

an external atmospheric pressure sensor disposed outside the chamber to detect external atmospheric pressure, said external atmospheric pressure sensor detecting atmospheric pressure which contains a long period fluctuation portion and a short period fluctuation portion; and a controller that controls pressure in said chamber based on detection results from said external atmospheric pressure sensor, wherein said controller is connected to the external atmospheric pressure sensor to control the pressure in said chamber so that said short period fluctuation portion of the atmospheric pressure with respect to said long period fluctuation portion of the atmospheric pressure is removed or suppressed.

13. A pressure control apparatus according to claim 12, wherein said controller removes or suppresses said short period fluctuation portion of external atmospheric pressure from an output signal from said external atmospheric pressure sensor.

14. A pressure control apparatus according to claim 13, wherein:

said controller computes a set atmospheric pressure based on a signal for which said short period fluctuation portion of external atmospheric pressure has been removed or suppressed, and controls the pressure in said chamber based on said set atmospheric pressure.

15. A pressure control apparatus according to claim 14, wherein said set atmospheric pressure is a pressure where a predetermined pressure value has been added to a signal for which said short period fluctuation portion of external atmospheric pressure has been removed from the output signal from said external atmospheric pressure sensor, or suppressed.

16. A pressure control method for controlling pressure in a chamber comprising the steps of:

detecting atmospheric pressure external to the chamber;

computing a long period fluctuation portion of the atmospheric pressure and a short period fluctuation portion of the atmospheric pressure from a detected pressure;

removing or suppressing said short period fluctuation portion of the atmospheric pressure with respect to said long period fluctuation portion of the atmospheric pressure, and computing a set pressure; and controlling the pressure in said chamber based on said set pressure.

17. A pressure control method according to claim 16, wherein gas supplied to inside said chamber is controlled based on said set pressure.

18. An exposure apparatus accommodated in the chamber incorporated in the pressure control apparatus according to claim 7.

19. An exposure apparatus accommodated in the chamber incorporated in the pressure control apparatus according to claim 12.

20. A chamber comprising:

a chamber body of which internal pressure is controlled;

an external atmospheric pressure sensor disposed outside the chamber body to detect external atmospheric pressure, said external atmospheric pressure sensor generating a signal output which contains a long period fluctuation portion of the atmospheric pressure and a short period fluctuation portion of the atmospheric pressure; and a controller that controls pressure in said chamber body based on the signal output from said external atmospheric pressure sensor, said controller being connected to the external atmospheric pressure sensor to control the pressure in said chamber body so that said short period fluctuation portion of the atmospheric pressure with respect to said long period fluctuation portion of the atmospheric pressure is removed or suppressed.

21. A chamber according to claim 20 which accommodates at least a part of a laser measuring apparatus or an exposure apparatus.

22. The chamber wherein pressure thereof is controlled by said pressure control method according to claim 16.

23. An exposure apparatus incorporating a laser measuring apparatus accommodated inside the chamber according to claim 22.

* * * * *